United States Patent
Rusk et al.

(10) Patent No.: US 6,613,233 B1
(45) Date of Patent: Sep. 2, 2003

(54) MULTIPLE MODE INDUSTRIAL PROCESS SYSTEM AND METHOD

(76) Inventors: Todd Rusk, 704 S. Grove, Urbana, IL (US) 61801; Joseph Pickowitz, 107 N. Elm, Pesotum, IL (US) 61863; Timothy Lindsey, 507 Northshore, Mahomet, IL (US) 61853; Kishore Rajagopalan, 1209 Foothill Dr., Champaign, IL (US) 61821

( * ) Notice: Subject to any disclaimer, the term of this patent is extended or adjusted under 35 U.S.C. 154(b) by 0 days.

(21) Appl. No.: 09/929,974

(22) Filed: Aug. 15, 2001

Related U.S. Application Data
(60) Provisional application No. 60/227,348, filed on Aug. 23, 2000.

(51) Int. Cl.$^7$ .............................................. B01D 61/58
(52) U.S. Cl. ................... 210/650; 210/805; 210/167; 210/168; 210/188; 210/258; 134/10; 134/109
(58) Field of Search ..................... 134/10, 109–111; 210/167, 168, 194, 257.1, 258, 321.6, 416.1, 424, 433.1, 650, 767, 805, 188, 180, 800

(56) References Cited

U.S. PATENT DOCUMENTS

| | | | |
|---|---|---|---|
| 3,970,560 A | * 7/1976 | Metzger | ..................... 210/167 |
| 4,876,015 A | * 10/1989 | McKibben | ................... 210/168 |
| 4,929,351 A | 5/1990 | Sanborn | |
| 4,986,918 A | 1/1991 | Breslau et al. | |
| 5,207,917 A | 5/1993 | Weaver | |
| 5,324,425 A | * 6/1994 | Ellison | ....................... 210/167 |
| 5,456,842 A | 10/1995 | Kibblehouse et al. | |
| 5,622,627 A | * 4/1997 | Fanning et al. | ............. 210/805 |
| 5,720,874 A | 2/1998 | Siegler | |
| 5,725,758 A | 3/1998 | Chace et al. | |

* cited by examiner

Primary Examiner—Joseph Drodge
(74) Attorney, Agent, or Firm—Gary R. Gillen; Wildman, Harrold, Allen & Dixon

(57) ABSTRACT

A method in which a fluid is driven into a process unit through utilization of a propulsion unit operating in a process mode. A process is performed which utilizes the fluid in the process unit. The propulsion unit is set to operate in a recycle mode and fluid contaminated by the process is driven into a recycling unit through utilization of the propulsion unit. A system comprises a process unit that utilizes a liquid to perform a process. A recycling unit recycles fluid contaminated by the process. A propulsion unit coupled to the process unit and the recycling unit is adjustable between a process mode and a recycle mode.

25 Claims, 4 Drawing Sheets

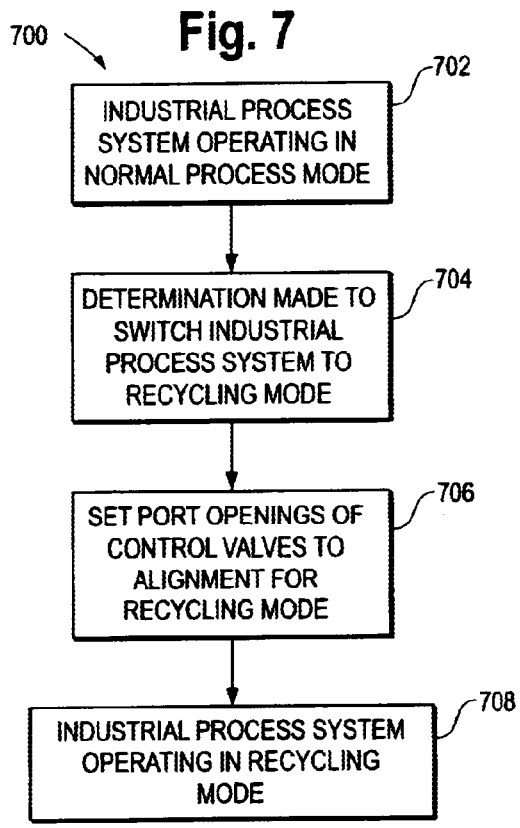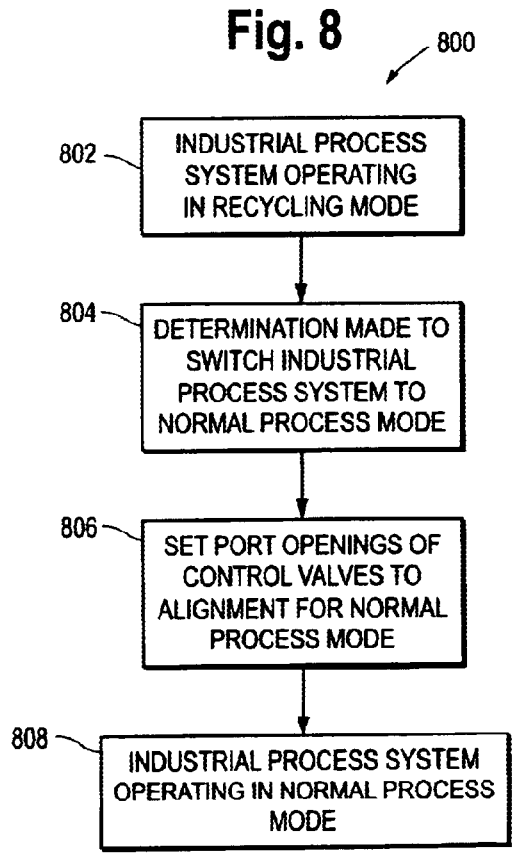

MULTIPLE MODE INDUSTRIAL PROCESS SYSTEM AND METHOD

CROSS REFERENCE TO RELATED APPLICATION

This application claims the priority from U.S. provisional application No. 60/227,348 filed on Aug. 23, 2000.

FIELD OF THE INVENTION

This invention relates generally to industrial process units that utilize pressurized working fluids.

BACKGROUND

Industrial process units typically include pumps to drive an industrial process fluid that the industrial process units employ to perform their function. For instance, aqueous parts washers often use alkaline detergents to remove contaminants (e.g., oils, grease, particulate matter, etc.) from the surfaces of work pieces. Likewise, machining operations employ cutting fluids to cool and lubricate a cutting tool and wash away contaminants (e.g., waste chips, oils, particulate matter, bacteria, etc.).

After a period of use, however, contaminants begin to accumulate in the industrial process fluid and thereby degrade the performance of the industrial process fluid. Therefore, it is desirable to employ a purification system to remove the contaminants from the industrial process fluid to extend the useful life of the fluids. It may also be desirable to remove the contaminants as a precursor to discharge of the industrial process fluid into a sewer system.

Known purification systems require the utilization of one or more pumps, in addition to the pump or pumps that an industrial process unit employs to pressurize and propel the industrial process fluid while performing their functions. The additional pump or pumps are used to transfer contaminated fluids into the purification system and to remove the contaminants from the industrial process fluid. Adding one or more pumps to an industrial process unit, however, is not cost effective given the cost of the additional pumps.

Therefore, a need exists for a cost effective approach to promote the removal of contaminants from an industrial process fluid in an industrial process unit.

BRIEF DESCRIPTION OF THE DRAWINGS

FIG. 7 is an exemplary flow diagram depicting a method in which an industrial process system is changed from a normal process mode to a recycling mode.

FIG. 8 is an exemplary flow diagram depicting a method in which an industrial process system is changed from a recycling mode to a normal process mode.

DETAILED DESCRIPTION

One example of a method is provided in which a fluid is driven into a process unit through utilization of a propulsion unit operating in a process mode. A process is performed which utilizes the fluid in the process unit. The propulsion unit is set to operate in a recycle mode and fluid contaminated by the process is driven into a recycling unit through utilization of the propulsion unit operating in the recycle mode.

A system is also provided, which comprises a process unit that utilizes the liquid to perform a process. A recycling unit recycles fluid contaminated by the process. A propulsion unit coupled to the process unit and the recycling unit is adjustable between a process mode for driving the liquid into the process unit and a recycle mode for driving contaminated fluid into the recycling unit.

Another method is provided in which fluid is driven into a process unit through utilization of a propulsion unit operating in a process mode. A process is performed in the process unit which utilizes the fluid. Fluid contaminated by the process is collected in a collection unit. The propulsion unit is set to operate in a recycling mode through setting a first port opening of a first control valve in alignment with plumbing that couples the first control valve to an inlet of a pump, setting a second port opening of the first control valve in alignment with plumbing that couples the first control valve to an outlet of the collection unit, setting a first port opening of the second control valve in alignment with plumbing that couples the second control valve to an outlet of the pump, and setting a second port opening of the second control valve in alignment with plumbing that couples the second control valve to an inlet of a recycling unit. The propulsion unit is utilized to drive contaminated fluid through the recycling unit to remove purified fluid from the contaminated fluid, to direct the purified fluid through a permeate line into the process unit, and to direct the contaminated fluid back into the collection unit.

Figure 1:
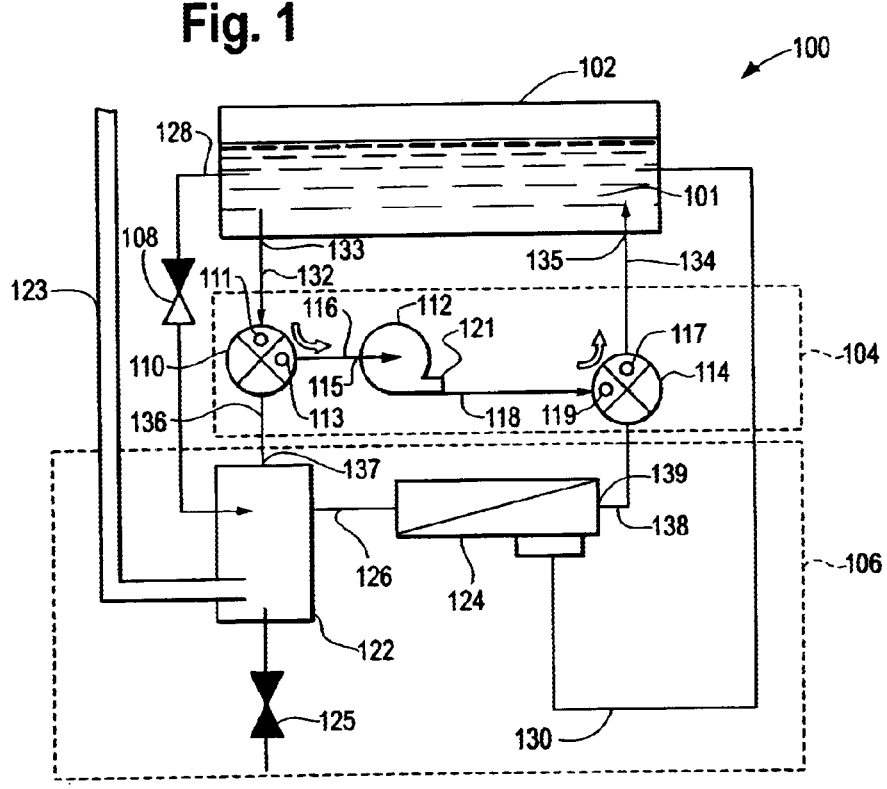
FIG. 1 is a functional diagram of one example of an industrial process system operating in a normal process mode.
Figure 2:
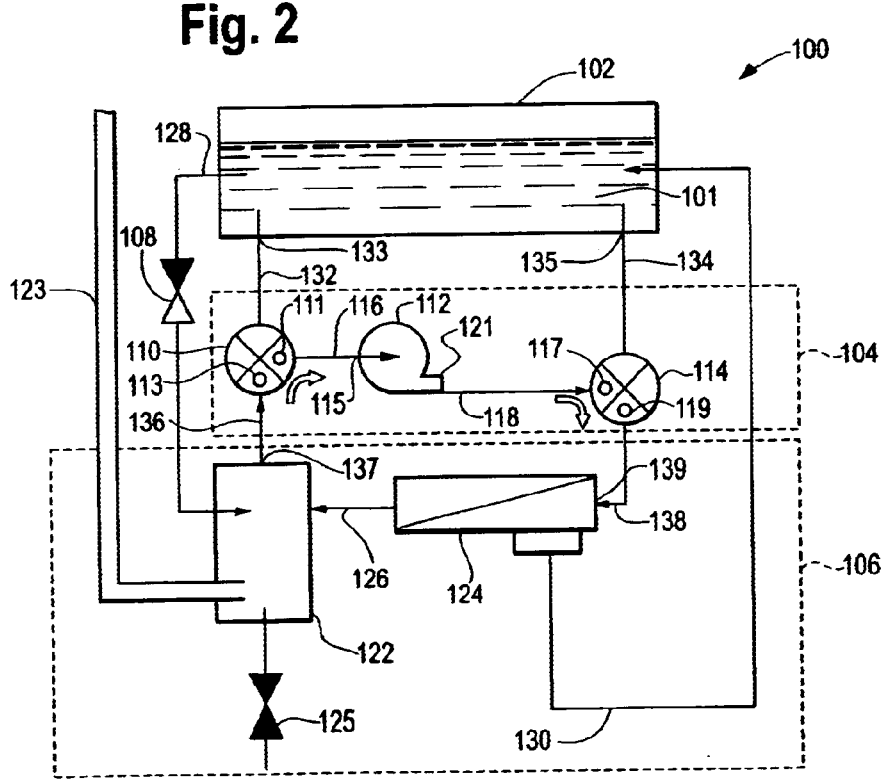
FIG. 2 is a functional diagram of one example of an industrial process system operating in a recycle mode.

Referring to FIGS. 1 and 2, an industrial process system 100 comprises industrial process unit 102, propulsion unit 104, purification unit 106, and check valve 108.

Industrial process unit 102 contains an industrial process fluid 101 and comprises a device that performs an industrial process through utilization of pump driven industrial process fluids. An example of such a device is an aqueous parts washer which cleans dirty industrial parts through employment of pressure driven industrial process fluid. The pressure used to drive the industrial process fluid 101 into the process unit is used to create a spray that is directed at a dirty industrial part. The spraying action mechanically assists the chemical cleaning action of the industrial processing fluid 101 to clean the industrial part. Another example of such a device is a machine tool that uses pumped industrial process fluid to cool and wash contaminants away from a cutting tool. In many of these devices process fluid is then used to circulate back through the system and reused to perform the function of the process unit 102. Unfortunately, this causes contaminates to build up in the fluid.

Referring again to FIGS. 1 and 2, propulsion unit 104 is adjustable between a process mode and a recycle mode. Propulsion unit 104 comprises first control valve 110, pump 112, and second control valve 114. Control valve 110 comprises first port opening 111 and second port opening 113. Control valve 110 is coupled through plumbing 116 to an inlet 115 of pump 112. Control valve 114 comprises first port opening 117 and second port opening 119. Control valve 114 is coupled through plumbing 118 to an outlet 121 of pump 112.

It should be noted that in one example the various plumbing described herein could comprise lengths of plumbing that couple the various components together through connectors. In another example, the lengths of plumbing could be omitted and the various components could be coupled directly together using fasteners.

Accordingly, in FIGS. 1 and 2, propulsion unit 104 comprises pump 112, first control valve 110, having a recycle mode position and a process mode position, coupled through a first length of plumbing 132 to an outlet 133 of process unit 122, coupled through a second length of plumbing 116 to an inlet 115 of pump 112, and coupled through a third length of plumbing 136 to an outlet 137 of collection unit 122. Propulsion unit 104 also includes second control valve 114, having a recycle mode position and a process mode position, coupled through a fourth length of plumbing 134 to an inlet 135 of process unit 102, coupled through a fifth length of plumbing 118 to an outlet 121 of pump 112, and coupled through a sixth length of plumbing 138 to an inlet 139 of recycling unit 124.

Purification unit 106 comprises collection unit 122 and one or more instances of recycling unit 124. Collection unit 122 is coupled through plumbing 126 to an output of recycling unit 124.

Collection unit 122 includes vent pipe 123 and drain 125. Collection unit 122 is utilized to collect contaminated industrial process fluid from industrial process unit 102, as will be discussed herein. An example of a collection unit 122 is a process tank. Collection unit 122, as shown in FIGS. 1 and 2, is an enclosed vessel. The fluid level in collection unit 122 is at lower vertical level than the fluid level in the industrial process unit 102. Alternatively, collection unit 122 could be an open top vessel with a fluid level at the same vertical height as the fluid level in industrial process unit 102.

In one example, vent pipe 123 vents air from collection unit 122. In a further example, vent pipe 123 extends to at least the height of the fluid in industrial process unit 102. This allows the fluid level in vent pipe 123 and the fluid level in industrial process unit 102 to reach a state of equilibrium, as will be discussed herein.

Drain 125 is used to remove fluid from collection unit 122.

Recycling unit 124 recycles industrial process fluid contaminated by the process carried out in process unit 102, as will be discussed herein. Examples of recycling unit 124 include tubular or spiral wound ultrafiltration membranes. Other examples of recycling unit 124 include microfiltration or nanofiltration membranes.

Referring still to FIGS. 1 and 2, industrial process unit 102 is coupled to collection unit 122 of purification unit 106 through fill line 128. Fill line 128 permits the force of gravity to propel contaminated industrial process fluid into collection unit 122, as will be described herein. Check valve 108 is disposed on fill line 128 to prevent fluid backflow from collection unit 122 into industrial process unit 102.

Industrial process unit 102 is coupled to recycling unit 124 of purification unit 106 through permeate line 130. Permeate line 130 directs purified industrial process fluid from membrane module 124 into industrial process unit 102, as will be discussed herein.

Industrial process unit 102 is coupled through plumbing 132 to control valve 110 and through plumbing 134 to control valve 114 of propulsion unit 104.

Collection unit 122 of purification unit 106 is coupled through plumbing 136 to control valve 110 of propulsion unit 104. Recycling unit 124 of purification unit 106 is coupled through plumbing 138 to control valve 114 of pump unit 104.

An illustrative description of operation for industrial process system 100 is now presented for explanatory purposes.

FIG. 1 provides an exemplary diagram of industrial process system 100 operating in a process mode. To set industrial process system 100 in process mode, propulsion unit 104 must be set in process mode by setting control valve 110 and control valve 114 to process mode position. Specifically in the process mode, port opening 111 of control valve 110 is aligned with plumbing 132 and port opening 113 of control valve 110 is aligned with plumbing 116. In a similar manner, port opening 117 of control valve 114 is aligned with plumbing 134 and port opening 119 of control valve 114 is aligned with plumbing 118.

In the process mode, pump 112 of propulsion unit 104 draws industrial process fluid 101 from industrial process unit 102, through plumbing 132 and port opening 111, into control valve 110. Control valve 110 diverts the fluid, through port opening 113 and plumbing 116, to pump 112. Pump 112 propels the fluid, through plumbing 118 and port opening 119, into control valve 114. Control valve 114 diverts the fluid, through port opening 117 and plumbing 134. Accordingly, fluid is driven by propulsion unit 104 into industrial process unit 102. Industrial process unit 102 then employs the fluid to perform an industrial process.

Figure 3:
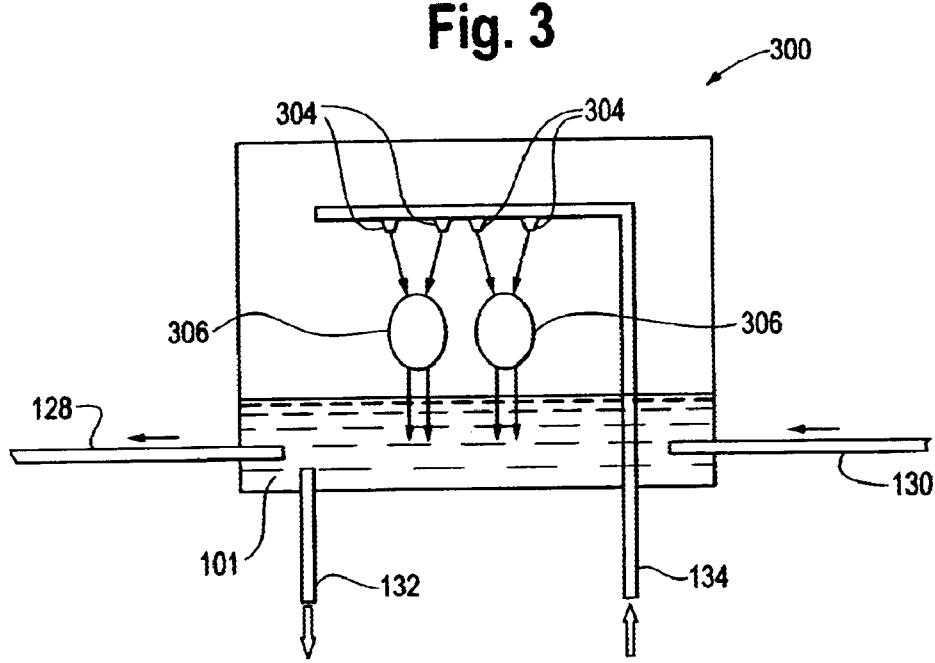
FIG. 3 is a functional diagram of an aqueous parts washer as an example of an industrial process unit that is employable in the industrial process system of FIGS. 1 and 2.

While industrial process unit 102 operates in process mode, propulsion unit 104 causes industrial process fluid 101 to circulate through industrial process unit 102. Contaminants therefore begin to accumulate in the industrial process fluid 101. For instance, in an example of an aqueous parts washer 300 shown in FIG. 3, industrial process fluid 101 is drawn from reservoir 302 through plumbing 132 to propulsion unit 104. The industrial process fluid passes through propulsion unit 104, as described above with reference to FIG. 1, and through plumbing 134 to spray nozzles 304. Spray nozzles 304 then spray industrial parts 306. As industrial parts 306 are sprayed, industrial process fluid and contaminants removed from industrial parts 306 flow back into reservoir 302. Aqueous parts washer 300 then reuses the industrial process fluid. Over a period of use, contaminants from industrial parts 306 accumulate in the industrial process fluid 101. Therefore, fluid contaminated by the process needs to be recycled by purification unit 106 and passed back to the acquaeous parts washer through permeate line 130, as will be discussed herein.

Turning back to FIG. 1, collection unit 122 collects contaminated fluid from industrial process unit 102. In one example, since collection unit 122 of purification unit 106 is vertically lower than industrial process unit 102, the force of gravity propels industrial process fluid (including any contaminants) from industrial process unit 102 through fill line 128 into collection unit 122. Check valve 108 prevents fluid backflow from collection unit 122 to industrial process unit 102. In one example, when the fluid level in vent pipe 123 and the fluid level in industrial process unit 102 reach an equilibrium, flow of contaminated fluid into collection unit 122 ceases. Accordingly, collection unit 122 is at capacity and no fluid can flow into collection unit 122.

Referring to FIG. 2, contaminants are removed from the industrial process fluid by placing industrial process system 100 in recycle mode. To place industrial process system 100 in recycle mode, propulsion unit 104 must be set to operate in recycle mode by setting control valve 110 and control valve 114 to a recycle mode position. In recycle mode, port opening 111 of control valve 110 is aligned with plumbing 116 and port opening 113 is aligned with plumbing 136. In a similar manner, port opening 117 of control valve 114 is aligned with plumbing 118 and port opening 119 is aligned with plumbing 138.

In recycle mode, pump 112 draws contaminated industrial process fluid from collection unit 122, through plumbing 136 and port opening 113, into control valve 110. Control valve 110 diverts the contaminated fluid, through port opening 111 and plumbing 116, to pump 112. Pump 112 propels the contaminated fluid, through plumbing 118 and port opening 117, into control valve 114. Control valve 114 diverts the contaminated fluid, through port opening 119 and plumbing 138. Accordingly, propulsion unit 104 drives contaminated fluid into recycling unit 124.

The force of pump 112 driving the contaminated fluid into recycling unit 124 creates a pressure drop across recycling unit 124. The pressure drop forces purified fluid through recycling unit 124. In one example, if recycling unit 124 were a membrane module, recycling unit 124 would be permeable to purified industrial process fluid but not to one or more contaminants in the industrial process fluid. Therefore, as purified fluid were to pass through recycling unit 124, recycling unit 124 would concentrate the contaminated fluid by removing purified fluid from the contaminated fluid. Permeate line 130 would then direct the purified fluid to industrial process unit 102.

As purified fluid leaves purification unit 106 and enters industrial process unit 102, the fluid level in collection unit 122 decreases. The force of gravity then causes contaminated fluid from industrial process unit 102 to refill collection unit with contaminated fluid 122 through fill line 128. In addition, any concentrated contaminated industrial process fluid from recycling unit 124 is circulated through plumbing 126 to collection unit 122, and therefore is retained within purification unit 106 for further purification.

Figure 4:
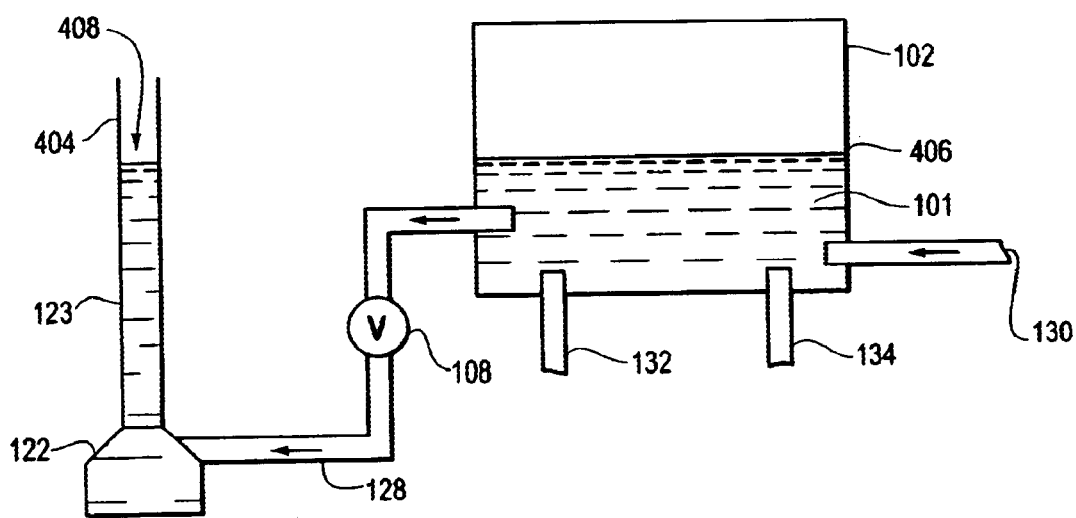
FIG. 4 is a functional diagram of one example of an arrangement that employs a vent pipe in the industrial process system of FIGS. 1 and 2 to gravitationally separate and remove one or more oils from a process tank.
Figure 5:
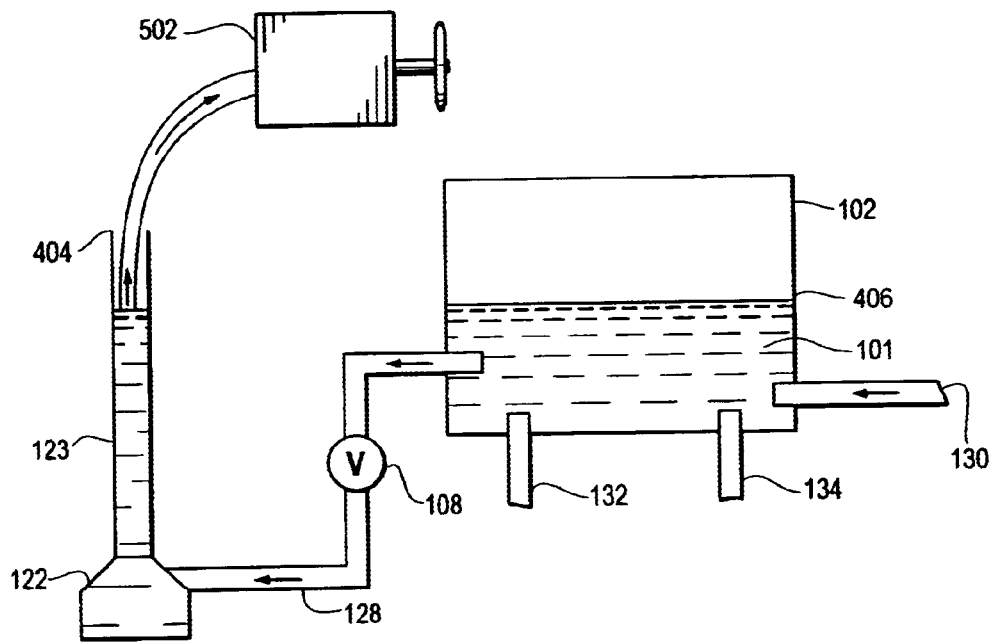
FIG. 5 is a functional diagram depicting a suction device as one example of a device that is employable to remove oils from the vent pipe in the arrangement shown in FIG. 4.
Figure 6:
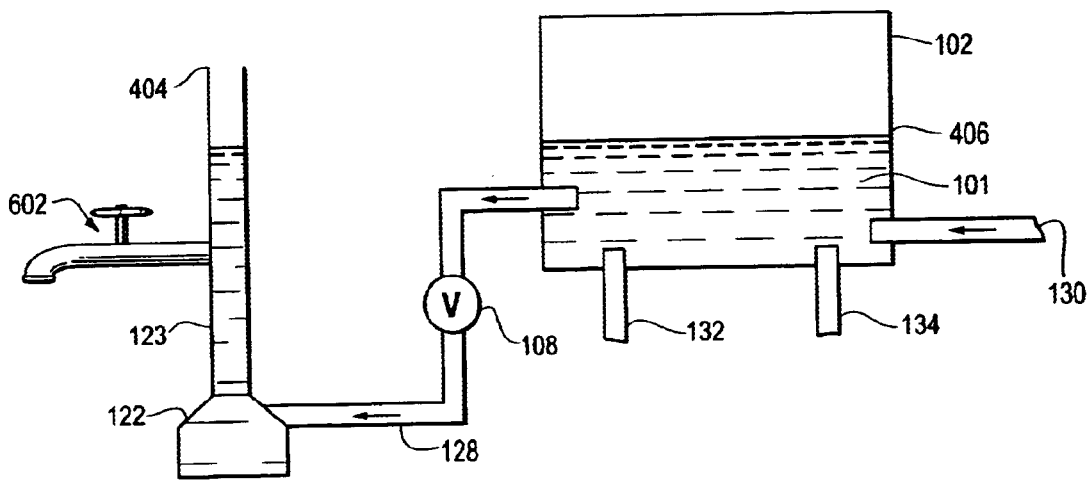
FIG. 6 is a functional diagram depicting a drain valve as one example of a device that is employable to remove oils from the vent pipe in the arrangement shown in FIG. 4.

FIGS. 4–6 disclose an exemplary arrangement of a portion of industrial process system 100. In the exemplary portion of system 100, while in process mode, propulsion unit 104 draws fluid 101 from process unit 102 through plumbing 132. The fluid 101 is circulated through propulsion unit 104, as described above with FIG. 1, and driven back into process unit 102 through plumbing 134. In recycle mode, purified fluid is driven into process tank through permeate line 130.

In FIGS. 4–6, however, industrial process system 100 also employs vent pipe 123 to collect contaminated fluid. In one example vent pipe 123 gravitationally separates and removes one or more free oils from collection unit 122. This arrangement is based on the principle that, in an immiscible mixture of fluids, a fluid with a lower specific gravity (e.g., oil) will float above a fluid with a higher specific gravity (e.g., water). This arrangement can be used in addition to, or as an alternative to, the recycle mode described above, to remove free oils from industrial process system 100. Employment of such an arrangement could extend the useful life of recycling unit 124.

For instance, if recycling unit 124 were a membrane module, performance of the membrane module would degrade significantly in the presence of free oil, due to fouling. Fouling is a phenomenon by which excessively concentrated contaminants partially or completely block the pores in the membrane that allow for efficient passage of clean process fluid. A fouled membrane is not able to economically deliver clean permeate at an acceptable rate. If the membrane were to become fouled, the contents of the process unit 102 would need to be discharged. The vent pipe 123 allows for removal of free oil; thus the interval between process unit 102 discharges can be extended almost indefinitely. The removed free oil has minimal or no water content and can often be sent off site to recover its energy content.

In FIG. 4, vent pipe 123, or alternatively a conduit in addition to vent pipe 123, is oriented so that its vertical height at the top 404 is at least equivalent to the height of the fluid level 406 within industrial process unit 102. Vent pipe 123 is attached to collection unit 122 in such a way (e.g., attached at the highest spot on a slanted top process tank) to encourage gravitationally separated free oils to float up to vent pipe 123 and create a separated oil layer. Referring to FIG. 5, in one example, a suction device 502, such as a handheld pump, is utilized to remove contaminated fluid from vent pipe 123. In one example, the suction device can be inserted into an open end of vent pipe 123 so as to remove one or more free oils from vent pipe 123. FIG. 6 depicts an exemplary arrangement in which a valve is utilized to remove contaminated fluid from vent pipe. In one example the valve is positioned such that one or more free oils can be removed from vent pipe 123 by opening the valve.

Referring to FIG. 7, a flowchart 700 describing the process by which industrial process system 100 is switched from process mode to recycle mode is now presented for explanatory purposes. In step 702, industrial process system 100 is in process mode. Accordingly, a process is being performed in industrial process unit 102, such as industrial parts washing or a machining operation, that employs an industrial process fluid. In step 704, an operator of industrial process system 100 makes a determination to switch industrial process system 100 to recycle mode. In one example, a human operator performs step 704 in accordance with some criteria (e.g., the level of contaminants in the industrial process flood). In another example, a mechanical or electrical process (e.g., a computer program) performs step 704 in accordance with some criteria (e.g., the level of contaminants in the industrial process flood). In step 706, propulsion unit 104 is set to operate in recycle mode. Specifically, port opening 111 of control valve 110 is positioned in alignment with plumbing 116 and port opening 113 of control valve 110 is positioned in alignment with plumbing 136, as was discussed in connection with FIG. 2. Also in step 706, port opening 117 of control valve 114 is positioned in alignment with plumbing 118 and port opening 119 of control valve 114 is positioned in alignment with plumbing 138, as was discussed in connection with FIG. 2. Step 706 is performed in response to the determination made in step 704. Setting the alignment of port openings 111, 113, 117, 119 in accordance with step 706 causes propulsion unit 104 to drive purified industrial process fluid through membrane module 124, and through permeate line 130 into industrial process unit 102, as was discussed in connection with FIG. 2. In one example, a human operator performs step 706 by manually manipulating control valves 110, 114. In another example, an electromechanical process (e.g. electrically actuated valve operated by human operator or computer program) performs step 706 by manipulating control valves 110, 114. Finally, in step 708, the industrial process system is in the recycling mode.

Referring to FIG. 8, a flowchart 800 describing the process by which the industrial process system 100 is switched from a recycling mode to a process mode is now presented for explanatory purposes. In step 802, industrial process system 100 is in recycling mode. In step 804, an operator of industrial process system 100 makes a determination to switch industrial process system 100 to process mode. In one example, a human operator performs step 804 in accordance with some criteria (e.g., the level of contaminants in industrial process fluid). In another example, a mechanical or electrical process (e.g., a computer program) performs step 804 in accordance with some criteria (e.g., the level of contaminants in the industrial process fluid). In step 806, propulsion unit 104 is set to operate in process mode; specifically port opening 111 of control valve 110 is positioned in alignment with plumbing 132 and port opening 113 of control valve 110 is positioned in alignment with plumbing 116, as was discussed in connection with FIG. 1. In a similar manner, port opening 117 of control valve 114 is positioned in alignment with plumbing 134 and port opening 119 of control valve 114 is positioned in alignment with plumbing 118, as was discussed in connection with FIG. 1. Setting the alignment of port openings 111, 113, 117, 119 in accordance with step 806 causes propulsion unit 104 to propel industrial process fluid to/from industrial process unit 102, as was discussed in connection with FIG. 1. In one example, a human operator performs step 806 by manually positioning control valves 110, 114. In another example, an electromechanical process (e.g. electrically actuated valve operated by human operator or computer program) performs step 806 by positioning control valves 110, 114. Finally, in step 808, the industrial process system is in the normal process mode.

As shown and described above, an industrial process system 100 is provided which utilizes a single pump 112 and a pair of diverter control valves 110, 114 which selectively divert the flow of process fluids between a process mode and a recycle mode. A first diverter control valve 110 is connected to industrial process unit 102, collection unit 122, and an inlet 115 of the single pump 112. The second diverter control valve 114 is connected to industrial process unit 102, recycling unit 124, and an outlet 121 of the single pump 112. Manipulation of the diverter control valves 110, 114 enables the flow of liquid to be moved through either the industrial process unit 102 (and pump unit 104) or the recycle stream through purification unit 106.

Accordingly, the multiple mode industrial process system and method provide an economic means of recycling industrial process fluids when compared to known systems. In one example this is accomplished by physically integrating a membrane filtration system into an industrial process unit via connective plumbing means, two control valves, and a check valve. A membrane filtration system may selectively comprise one or more membrane modules, a process tank, a means of venting the process tank, connective plumbing means, and a permeate line. A process tank, membrane filtration system, control valves, and check valve in one example are selectively configurable to enable the membrane filtration system to be filled by the force of gravity, so long as the industrial process unit's tank is sufficiently full. The system in a further example may be configured to enable industrial process fluid to be driven through a membrane filtration system by employing a single pump that is associated with the industrial process unit. A permeate line can return the purified industrial process fluid to the tank of the industrial process unit.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All these variations are considered a part of the invention.

Although certain embodiments have been depicted and described in detail herein, it will be apparent to those skilled in the relevant art that various modifications, additions, substitutions and the like can be made without departing from the spirit of the invention and these are therefore considered to be within the scope of the invention which is defined by the appended claims and their equivalents.

What is claimed is:

1. A method, comprising the steps of:
    driving a fluid into a process unit through utilization of a propulsion unit operating in a process mode;
    performing a process in the process unit utilizing the fluid;
    collecting contaminated fluid from the process unit in a collection unit;
    setting the propulsion unit to operate in a recycle mode through placing a first control valve and a second control valve to a recycle mode position by coupling a first port opening of the first control valve with an inlet of a pump, coupling a second port opening of the first control valve with an outlet of the collection unit, coupling a first port opening of the second control valve with an outlet of the pump, and coupling a second port opening of the second control valve with an inlet of a recycling unit; and
    driving fluid contaminated by the process into a recycling unit through utilization of the propulsion unit operating in the recycle mode.

2. The method of claim 1, wherein the step of placing the first control valve and the second control valve in the recycle mode position comprises the steps of:
    positioning the first port opening of the first control valve in alignment with plumbing that couples the first control valve to the inlet of the pump,
    positioning the second port opening of the first control valve in alignment with plumbing that couples the first control valve to the outlet of the collection unit,
    positioning the first port opening of the second control valve in alignment with plumbing that couples the second control valve to the outlet of the pump, and
    positioning the second port opening of the second control valve in alignment with plumbing that couples the second control valve to the inlet of the recycling unit.

3. The method of claim 1, wherein the step of collecting comprises the step of:
    permitting the force of gravity to propel the contaminated fluid from the process unit into a fill line, and
    receiving the contaminated fluid through the fill line.

4. The method of claim 3, wherein the step of driving fluid contaminated by the process comprises the steps of:
    driving the contaminated fluid into the recycling unit which concentrates the contaminated fluid by removing purified fluid from the contaminated fluid, and
    directing the purified fluid through a permeate line into the process unit.

5. A method, comprising the steps of:
    driving a fluid into a process unit through utilization of a propulsion unit operating in a process mode;
    performing a process in the process unit utilizing the fluid;
    collecting contaminated fluid from the process unit in a collection unit by permitting the force of gravity to propel the contaminated fluid from the process unit into a fill line and receiving the contaminated fluid through the fill line;

setting the propulsion unit to operate in a recycle mode; and circulating the contaminated fluid from the collection unit through a first control valve, through the propulsion unit, through a second control valve, to a recycling unit, and back into the collection unit, wherein fluid contaminated by the process is driven by the propulsion unit into the recycling unit, which concentrates the contaminated fluid by removing purified fluid from the contaminated fluid, and wherein the purified fluid is directed through a permeate line into the process unit.

6. The method of claim 5, further comprising the step of:

setting the propulsion unit to operate in a process mode.

7. The method of claim 6, wherein the step of setting the propulsion unit to operate in the process mode comprises the step of:

setting the first control valve and the second control valve to a process mode position.

8. A method, comprising the steps of:

driving a fluid into a process unit through utilization of a propulsion unit operating in a process mode;

performing a process in the process unit utilizing the fluid;

setting the propulsion unit to operate in a recycle mode;

driving fluid contaminated by the process into a recycling unit through utilization of the propulsion unit operating in the recycle mode;

setting the propulsion unit to operate in a process mode through setting a first control valve and a second control valve to a process mode position by positioning a first port opening of the first control valve in alignment with an outlet of the process unit, positioning a second port opening of the first control valve in alignment with an inlet of a pump, positioning a first port opening of the second control valve in alignment with an inlet of the process unit, and positioning a second port opening of the second control valve in alignment with an outlet of the pump.

9. The method of claim 8, wherein the step of driving the fluid into the process unit comprises the step of:

circulating the fluid from the process unit through the first control valve, through the pump, through the second control valve, and back into the process unit.

10. The method of claim 8, wherein the step of driving the fluid into the process unit comprises the step of:

driving the fluid into the process unit with a single pump.

11. The method of claim 8, wherein the step of driving the fluid contaminated by the process comprises the step of:

driving the fluid contaminated by the process into the recycling unit with a single pump.

12. The method of claim 1, further comprising the step of:

collecting contaminated fluid in a vent pipe.

13. The method of claimed 12, further comprising the step of:

removing the contaminated fluid from the vent pipe through utilization of a suction device.

14. The method of claim 12, further comprising the step of:

removing the contaminated fluid from the vent pipe through utilization of a valve.

15. A system comprising:

a process unit in which a process is performed that utilizes a fluid;

a collection unit coupled to the process unit that collects contaminated fluid from the process unit;

a recycling unit that recycles the contaminated fluid; and a propulsion unit coupled to the process unit and the recycling unit that is adjustable between a process mode for driving the fluid into the process unit and a recycle mode for driving the contaminated fluid into the recycling unit, wherein the propulsion unit comprises a pump, a first control valve, having a recycle mode position and a process mode position, coupled to an outlet of the process unit, coupled to an inlet of the pump, and coupled to an outlet of the collection unit; and a second control valve, having a recycle mode position and a process mode position, coupled to an inlet of the process unit, coupled to an outlet of the pump, and coupled to an inlet of the recycling unit.

16. The system of claim 15, wherein:

the first control valve is coupled through a first length of plumbing to the outlet of the process unit, coupled through a second length of plumbing to the inlet of the pump, and coupled through a third length of plumbing to the outlet of the collection unit, and the second control valve, having a recycle mode position and a process mode position, is coupled through a fourth length of plumbing to the inlet of the process unit, coupled through a fifth length of plumbing to the outlet of the pump, and coupled through a sixth length of plumbing to the inlet of the recycling unit.

17. The system of claim 16, wherein the first control valve and the second control valve each include a first port opening and a second port opening.

18. The system of claim 17, wherein the first control valve is set to recycle mode through alignment of the first port opening of the first control valve with the second length of plumbing and alignment of the second port opening of the first control valve with the third length of plumbing, and the second control valve is set to recycle mode through alignment of the first port opening of the second control valve with the fifth length of plumbing and alignment of the second port opening of the second control valve with the sixth length of plumbing.

19. The system of claim 17, wherein the first control valve is set to process mode through alignment of the first port opening of the first control valve with the first length of plumbing and alignment of the second port opening of the first control valve with the second length of plumbing, and the second control valve is set to process mode through alignment of the first port opening of the second control valve with the fourth length of plumbing and alignment of the second port opening of the second control valve with the fifth length of plumbing.

20. The system of claim 15, further comprising:

a fill line that connects the process unit to the collection unit, wherein the collection unit collects contaminated fluid through the fill line.

21. The system of claim 20, wherein the collection unit comprises a tank that is positioned gravitationally lower than the process unit and receives contaminated fluid from the process unit through the force of gravity directing the contaminated fluid through the fill line.

22. The system of claim 15, wherein the recycling unit comprises:

a membrane module.

23. The system of claim 22, wherein the membrane module is coupled to the process unit through a permeate line.

24. The system of claim 15, wherein the propulsion unit comprises:

a single pump that is the only pump in the propulsion unit.

25. A method, comprising the steps of:

driving a fluid into a process unit through utilization of a propulsion unit operating in a process mode;

performing a process in the process unit utilizing the fluid;

collecting fluid contaminated by the process in a collection unit;

setting the propulsion unit to operate in a recycling mode through setting a first port opening of a first control valve in alignment with plumbing that couples the first control valve to an inlet of a pump, setting a second port opening of the first control valve in alignment with plumbing that couples the first control valve to an outlet of the collection unit, setting a first port opening of a second control valve in alignment with plumbing that couples the second control valve to an outlet of the pump, and setting a second port opening of the second control valve in alignment with plumbing that couples the second control valve to an inlet of a recycling unit; and utilizing the propulsion unit to drive contaminated fluid through the recycling unit to remove purified fluid from the contaminated fluid, to direct the purified fluid through a permeate line into the process unit, and to direct the contaminated fluid back into the collection unit.

* * * * *

UNITED STATES PATENT AND TRADEMARK OFFICE
CERTIFICATE OF CORRECTION

PATENT NO. : 6,613,233 B1 Page 1 of 1
DATED : September 2, 2003
INVENTOR(S) : Rusk et al.

It is certified that error appears in the above-identified patent and that said Letters Patent is hereby corrected as shown below:

<u>Title page,</u>
Please insert the following: -- [73] Assignee: The Board of Trustees of the University of Illinois, Urbana, IL (US) --

Signed and Sealed this

Sixth Day of January, 2004

JAMES E. ROGAN
*Director of the United States Patent and Trademark Office*